United States Patent [19]

Rannou et al.

[11] 4,387,122
[45] Jun. 7, 1983

[54] METHOD FOR THE MANUFACTURE OF MATERIAL ABSORBING ULTRA-HIGH FREQUENCY WAVES

[75] Inventors: Jean Rannou; Michel Grozellier; Marcel Godet, all of Paris, France

[73] Assignee: Thomson-CSF, Paris, France

[21] Appl. No.: 204,040

[22] Filed: Nov. 4, 1980

[30] Foreign Application Priority Data

Nov. 9, 1979 [FR] France .............................. 79 27709

[51] Int. Cl.³ .......................... B05D 3/02; B05D 3/12
[52] U.S. Cl. ............................... 427/244; 427/393.5; 427/430.1
[58] Field of Search ............ 427/244, 275, 290, 430.1, 427/393.5, 331; 343/18 A

[56] References Cited

U.S. PATENT DOCUMENTS

1,825,509 9/1931 Collins .............................. 427/430.1
3,239,585 3/1966 Karpovich et al. .................. 264/84
4,046,939 9/1977 Hart ................................... 428/311

FOREIGN PATENT DOCUMENTS

1468854 2/1967 France .
2147839 3/1973 France .
2156856 6/1973 France .

OTHER PUBLICATIONS

Siemens Zeitschrift, vol. 40, No. 4, Apr. 1966, pp. 326–328.
Chemical Abstracts, vol. 84, No. 24, Jun. 14, 1976, Reference 207274B, p. 55.

Primary Examiner—Evan K. Lawrence
Attorney, Agent, or Firm—Cushman, Darby & Cushman

[57] ABSTRACT

A method of producing a material for absorbing ultra-high frequency waves from a starting porous material having closed cells includes the steps of immersing the porous material into a fluid having a liquid component, suspended carbon, and a dissolved polymerizable binder, applying sufficient pressure to the fluid to open the closed cells of the porous material, allowing the fluid to disperse into the opened cells, removing the porous material from the fluid, drying the porous material to remove the liquid component, and closing the cells by polymerizing the binder.

8 Claims, 4 Drawing Figures

METHOD FOR THE MANUFACTURE OF MATERIAL ABSORBING ULTRA-HIGH FREQUENCY WAVES

BACKGROUND OF THE INVENTION

In numerous technical fields dependent on ultra-high frequencies, such as for example detection equipment, it is necessary to have materials absorbing ultra-high frequency waves to prevent, for example, stray couplings between the transmitting and receiving antenna when the latter are separated. These materials also play a decisive part in the research and development of radar antennas and more generally in telecommunications in special chambers called "anechoic rooms". The walls thereof are completely covered with a material which absorbs ultrahigh frequency waves in order that only the direct incident wave is received by the antenna in question.

The prior art absorbent materials can be subdivided into two main categories:
- absorbent materials with a low reflection coefficient and moderate attenuation, generally in the form of an alveolar material with communicating cavities or foam;
- absorbent materials with high attenuation and whose reflection coefficient, with a by no means negligible reflection coefficient and in the form of rigid blocks.

The first type of absorbent material is generally obtained from a porous material or a foam, whose cavities are interconnected. By successively immersing the material in a suspension of carbon in very fine powder form and drying, an absorbant material is obtained having the properties indicated in the first category. However, this absorbant material has the disadvantage of a thermal behaviour not exceeding 100° C., high moisture absorption due to the interlinked cavities, so that the material becomes unsuitable due to a considerable increase in the dielectric constant and difficulties linked with the precision machining, which is particularly necessary for members located in the vicinity of antennas.

The absorbant materials in the second category generally have a high density, so that their use in even more difficult, especially in airborne equipment.

SUMMARY OF THE INVENTION

The present invention therefore relates to a method for the manufacture of an absorbent material for ultrahigh frequency waves, wherein it comprises immersing a porous material having closed cavities in a fluid comprising a liquid component such as water containing suspended carbon and in which is dissolved a polymerizable binder, application of an adequate pressure to create openings in the alveolar walls and thus permit a diffusion of the carbon suspension into the cavities, removal of the thus obtained porous material and drying the thus treated porous material at a temperature ensuring the evaporation of the field (e.g. water) and the polymerization of the binder, thereby closing the openings made in the alveolar walls by an appropriate physical and/or chemical process.

BRIEF DESCRIPTION OF THE DRAWINGS

The invention is described in greater detail hereinafter relative to non-limitative embodiments and the attached drawings, wherein show.

DESCRIPTION OF THE PREFERRED EMBODIMENTS

As stated hereinbefore, the method according to the invention comprises immersing the closed cavity material in a fluid comprising a liquid component such as water, suspend carbon and a dissolved polymerizable binder, interconnecting the cavities by applying a pressure so as to diffuse the carbon and the binder in the cavities, removing the porous material treated in this way, drying it in order to remove the water and finally polymerizing the binder. The first stage of the method according to the invention comprises introducing the carbon suspension into a porous material with closed cavities.

Figure 1:
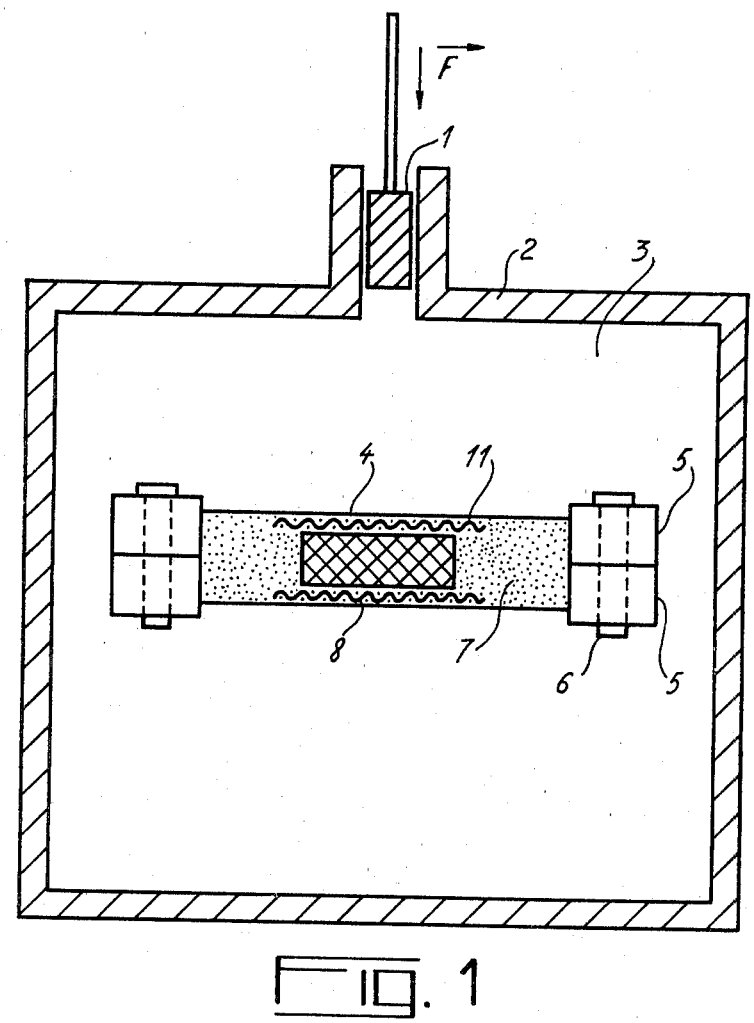
FIG. 1 the diagram of an example of the device for performing the method according to the invention.

FIG. 1 shows an embodiment of an apparatus for performing this first stage of the method. It comprises a container 2 completely filled with a liquid or gas 3, which in preferred but non-limitative manner is a liquid and more specifically is water. The desired pressure can be obtained in container 2 by an orifice in which is located a piston 1. Within the container 2 and either joined or not joined thereto is hermetically sealed enclosure 5 containing the porous material 8 and the carbon suspension 7. The internal volume of the enclosure 5 is equal to the sum of the volumes of the porous material 8 and the carbon suspension 7. According to a preferred, but non-limitative embodiment, the enclosure has two metallic parts 5 fixed to one another in hermetic manner by fixing means 6, e.g. nuts. At least one flexible and waterproof wall 4 is then provided in the enclosure 5. These walls can, for example, be made from a plastic material. Grids 11 are located between the porous material 8 and the flexible walls 4 so as to prevent, in the case of high pressure, the plugging of the cavities of the porous material with the flexible walls 4, which would stop the carbon suspension from diffusing in the cavities. In a simplified version of the apparatus of FIG. 1, enclosure 5 can be a hermetically sealed bag made from a flexible, waterproof material.

In preferred manner, the carbon suspension is aqueous and contains a binder which is soluble in the carbon suspension fluid and which is able to polymerize under specific physical and/or chemical conditions, e.g. an ordinary drying process. It is in particular possible to use a colloidal carbon solution or even a simple emulsion.

Figure 2:
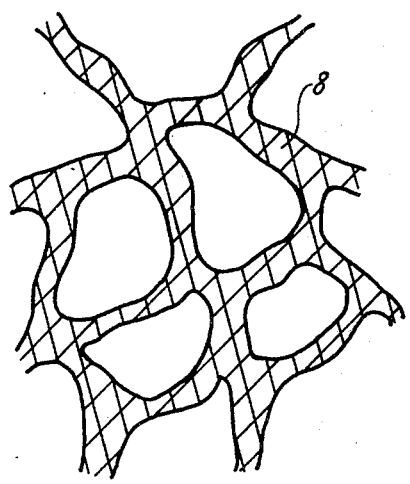
FIG. 2 a sectional diagram showing the alveolar structure of the porous product used.

FIG. 2 shows a sectional diagram of the porous body 8, the only requirement made is that it has closed cavities. According to a preferred embodiment, this porous material is expanded polyurethane.

Figure 3:
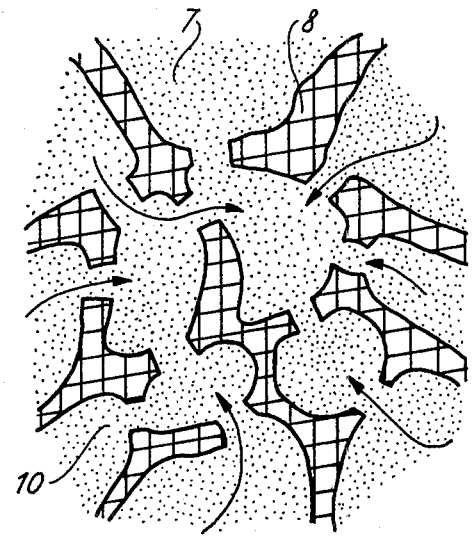
FIG. 3 a sectional diagram showing the linking of the cavities under the action of the pressure applied.

FIG. 3 is a sectional view of the porous material 8 when the carbon suspension 7 and binder 9 is exposed to the pressure of the liquid 3 in container 2 via flexible walls 4. When this pressure exceeds a threshold of, for example, approximately 50 bars, the points 10 of least resistance of the alveolar walls give way permitting the diffusion of the carbon suspension 7.

Figure 4:
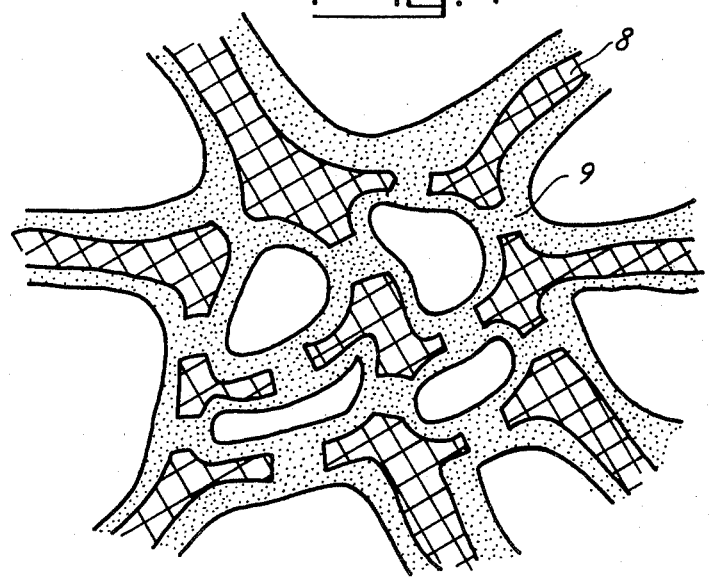
FIG. 4 a sectional diagram showing the structure of the cavities after drying.

In a second stage, the thus treated porous material 8 is removed from the pressure container 2 and dried at a temperature exceeding 100° C. FIG. 4 shows a diagram illustrating in sectional form the material obtained at the end of drying. The binder 9 is then polymerized either by heat action or by evaporating the water in the case of a polycondensation effect material, such as for example self-crosslinking acrylic resins, or by any other suitable physical and/or chemical process. The orifices between the cavities which are for example simple cracks in the cavity walls are of limited size, so that they are in this way blocked and prevent any absorption of moisture. At the end of the polymerization of the binder, the carbon is partly mixed with the binder and partly held captive in the closed cavities.

By modifying in this way the carbon concentration in suspension 7 and the pressure, it is possible to obtain a more or less effective ultra-high frequency wave-absorbing material. The superimposing of a number of layers of such a material with progressive carbon concentrations makes it possible to provide an effective antireflection treatment for ultra-high frequency waves.

In addition, such a material has the advantage of a thermal behaviour of close to 200° C. and a moisture absorption which is equivalent to that initially of the porous material only. In addition, its specific gravity differs little from that of the original porous material.

A coating of varnish or any other water-proofing material may optionally be placed on the surfaces of the absorbent material formed in this way in order to increase the sealing thereof.

In the appratus used for the realization of this absorbent material the pressure can be directly applied to the interior of the enclosure 5 containing the carbon suspension and porous material 8. In this case, the walls of enclosure 5 are all rigid.

Thus, a method has been described for the manufacture of an ultra-high frequency wave-absorbent material.

What is claimed is:
1. A method of producing a material for absorbing ultra-high frequency waves from a starting porous material having closed cells, the method comprising the steps of:
   (a) immersing the porous material into a fluid comprising a liquid component, suspended carbon, and a dissolved polymerizable binder;
   (b) applying sufficient pressure to the fluid to open the closed cells of the porous material immersed in the fluid according to step (a);
   (c) allowing the fluid comprising the liquid component, the suspended carbon, and the dissolved binder to disperse into the cells of the porous material opened according to step (b);
   (d) removing the porous material from the fluid;
   (e) drying the porous material removed according to step (d) at elevated temperatures so as to remove said liquid component; and
   (f) closing the cells of the porous material by polymerizing the binder dispersed into the cells according to step (c).
2. A method according to claim 1, wherein the porous material is expanded polyurethane.
3. A method according to claim 1, wherein step (b) is practiced by applying hydrostatic pressure to the fluid.
4. A method as in claim 1 or 3 wherein step (e) is practiced at a temperature greater than about 100° C.
5. A method as in claim 4 wherein the binder consists essentially of self-crosslinking acrylic resin.
6. A method according to claim 1 wherein the liquid component is water.
7. A method according to claim 6 wherein step (e) is practiced at a temperature sufficient to evaporate the water.
8. A method according to claim 1 or 7 wherein steps (e) and (f) are practiced concurrently.

* * * * *